United States Patent [19]
Newhall

[11] 3,889,658
[45] June 17, 1975

[54] VIVO TEMPERATURE SENSING METHOD AND APPARATUS

[76] Inventor: Jay H. Newhall, Bozeman, Mont. 59715

[22] Filed: Apr. 8, 1974

[21] Appl. No.: 458,647

Related U.S. Application Data
[63] Continuation-in-part of Ser. No. 333,695, Feb. 20, 1973, abandoned.

[52] U.S. Cl............ 128/2 H; 128/2 R; 128/2.05 D; 119/1
[51] Int. Cl.......................... A61b 5/02; A61b 10/00
[58] Field of Search.. 128/2 R, 2 H, 2.05 D, 2.05 F, 128/2.05 R, 2.1 R, 348, 349; 119/1

[56] References Cited
UNITED STATES PATENTS

| | | | |
|---|---|---|---|
| 3,039,468 | 6/1962 | Price............................ | 128/348 X |
| 3,158,133 | 11/1964 | Larson................................... | 119/1 |
| 3,158,134 | 11/1964 | Larson................................... | 119/1 |
| 3,297,020 | 1/1967 | Mathiesen.......................... | 128/2 H |
| 3,308,667 | 3/1967 | Pearlman............................ | 128/2 H |
| 3,515,124 | 6/1970 | Gurchot.............................. | 128/348 |
| 3,589,360 | 6/1971 | Sinclair............................ | 128/2.05 F |

Primary Examiner—Aldrich F. Medbery
Attorney, Agent, or Firm—Schroeder Siegfried Ryan & Vidas

[57] ABSTRACT

As in vivo temperature telltale and a method of using same for visually providing an indication that individual cattle have experienced an internal temperature in excess of a predetermined minimum as an early warning to the cattle raiser that there may be a disease-producing pathogen present in the cattle thus making possible segregation and early treatment of a disease.

20 Claims, 16 Drawing Figures

3,889,658

VIVO TEMPERATURE SENSING METHOD AND APPARATUS

This application is a continuation-in-part of my co-pending patent application Ser. No. 333,695, filed Feb. 20, 1973, and now abandoned, entitled IN VIVO TEMPERATURE SENSING METHOD AND APPARATUS.

The present invention is directed to the field of livestock raising and is more particularly directed to apparatus for use in providing an early warning to the livestock raiser that an individual animal may have contracted a disease thus making it possible for the raiser to isolate and treat such individual animal at an early stage of the disease. It is well known that the early detection of disease increases the probability of successful treatment thereof. Likewise, early detection of disease increases the probability that isolation of the diseased animal will prevent spread of the disease.

In accordance with the present invention there is provided an implanted temperature telltale and method for using same for each animal. The telltale is inserted at a stage in the animal raising wherein disease is apt to be encountered. The telltale of the invention provides a remotely visual indication that an animal has experienced an internal temperature which is in excess of some predetermined maximum and thus may possibly be diseased. It is well known that one of the earliest indications of disease in warm-blooded animals is a change in the temperature of the animal; usually an elevated temperature change. Early detection of such an increase in temperature is obviously advantageous both for the treatment of the disease as well as for preventing its spread. It is also generally recognized that there are certain times when animals are more susceptible to diseases than at other times. These times include when the animal is being shipped from one location to another and when the animal is placed into feed lots where there are a large number of other animals. When calves are being weaned from their mothers there is also a tendency for them to contract diseases.

While the invention will be of use with a wide variety of animals, for the sake of brevity in the explanation which follows it will be particularly described for its use with beef cattle.

For all but the smallest operations it becomes impractical to keep cattle under individual surveillance or to monitor their daily temperatures by the usual techniques such as rectal thermometers.

In accordance with the present invention, a relatively inexpensive implantable temperature telltale is provided which is placed into the animal in a manner such that at least a portion thereof lies internal to the animal and senses the temperature at such internal location. By implantable is meant that a permanent or semi-permanent installation of the sensor portion of the device is made within a region of the animal which has a temperature which is close to that of the bulk thereof. The telltale is left in the animal during the period that it is anticipated that the animal will undergo exposures to disease. Such a period may extend for weeks or even months. The indication that the animal may have undergone at least preliminary stages of a disease is provided by the visual change in the portion of the telltale which extends outwardly from the animal and which can be visually observed by a cattle handler at a considerable distance. This makes it possible for relatively low skill cattle handlers to identify animals which may be diseased.

Another possible use of the invention is in the identification of estrus.

The device and method of the present invention comprises two joined and yet distinct elements. In certain forms of the invention the joining is at the place of manufacture. In others the joining will be by the actual user of the device. The first element is a reservoir element which contains a first reactant material and is of a shape so that at least a portion thereof can be semi-permanently inplanted in the animal. The second portion of the apparatus of the invention is joined to the first, prior to or after its insertion into the animal. This second portion is desirably in the form of a flat tag shaped member which extends outwardly of the animal and is in a position where it can readily be observed by the cattle raiser at distances of 30 feet or more. Intermediate the reservoir and the indicating portions there is provided a connecting tube and a barrier means which separates the reactant in the reservoir from an indicator substance contained within the indicator portion. The barrier is displaced as a result of the increased temperature of the animal above some predetermined limit thereby resulting in a contact of the reactant and indicator substances to produce the visual change in the indicator portion.

The invention will be most readily understood from the accompanying drawings and following specification wherein:

Figure 1:
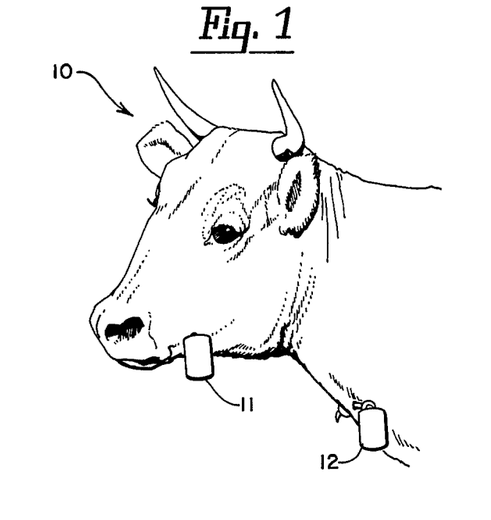
FIG. 1 is a perspective view of the head and neck portion of a cow showing two alternative devices in accordance with the invention implanted therein.

Turning now to the drawings there is illustrated in FIG. 1 a perspective view of the head portion 10 of a cow showing two alternate positions, 11 and 12 respectively, for implanting a temperature telltale in accordance with the invention. A number of factors determine the suitablilty of various portions of the animal for implantation of a telltale in accordance with the invention. The implantation site must have a temperature which corresponds to or at least is proportional to the temperature of the main bulk of the animal and the device also must be located in such a position that it will not be adversely affected by extremes in the external environment. In particular if the telltale is located in an area which receives full sunlight, the intermediate subcutaneous temperature is affected by such sunlight to falsely indicate an elevation of the temperature of an animal. Likewise, if the external temperature is extremely cold, this can have an adverse effect. The preferred location for the telltale for cattle and other large grazing animals is to be implanted between the fourth incisor and the first premolar tooth in the lower jaw of the animal. For greatest accuracy it is desirable that the reservoir be beneath the animal's tongue. This preferred position is generally indicated as telltale 11. Alternatively, one may utilize areas such as the throat 12, although this is not as satisfactory a location. The brisket area is preferable over the throat region 12 for its more uniform temperature. Each of these locations has the advantage that it is readily visible and yet to some degree is shielded from the effects of the environment.

In each of the possible selections which include other areas such as the base of the ear, the cheek and so forth, one must recognize that animals typically will tend to try to rub off any foreign object. If the object is in a region that the animal normally scratches, there is increased possibility that the animal will actually damage the telltale. The temperature in the mouth of the animal has been found to be stable and representative of the temperature of the bulk of the animal and is further in a location where it is relatively insensitive to external environmental effects.

The telltale in accordance with the invention may take a number of different forms. In each of the forms there are certain common features. Several of the forms of the invention involve a tube-like section having properties analogous to that of a hypodermic needle so shaped and formed that it can be inserted through a portion of the hide of the animal. One form of the invention has a tube-like section which does not itself penetrate through the hide of the animal. In still another form of my invention the reservoir portion of the telltale serves as a penetration element. Each of the forms of my invention comprise an indicator portion positioned outside of the animal, a sensor or reservoir portion internal to the animal and a connecting tube portion for transmitting what has been sensed to the indicator portion.

Within the tube portion in the preferred form of my invention, there is a barrier which operates to separate a first reactant contained in a reservoir portion of the tube from the externally positioned indicator portion of the apparatus. The indicator portion of the apparatus contains the necessary substances to provide the visual telltale that the barrier region has been breached due to the thermal changes within the animal and has permitted the reactant substance within the reservoir to come into the indicator portion.

In the discussion which follows parts having the same function will be given the same numerical designation.

Figure 2:
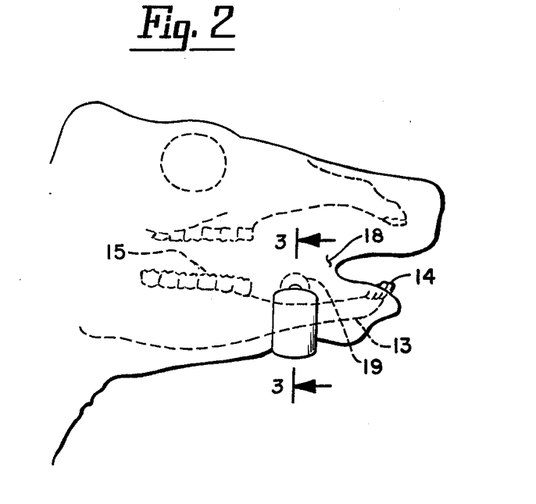
FIG. 2 is a side view of the jaw of a cow in phantom with a device in accordance with the invention positioned therein.
Figure 3:
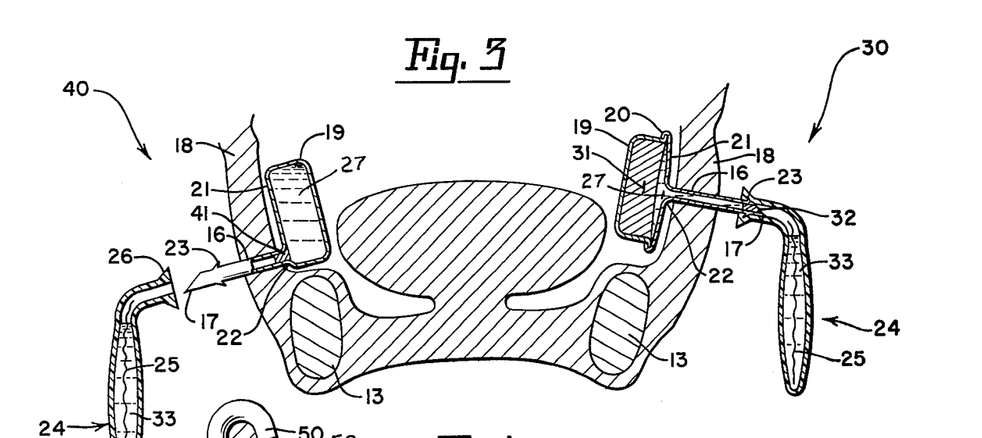
FIG. 3 is a front cross-sectional view of the jaw of FIG. 2 along lines 3—3 showing two alternate devices in accordance with the invention.

Referring more specifically to devices in accordance with the invention, there is illustrated in FIGS. 2 and 3 both the positioning of devices in accordance with the invention as well as two forms that these devices may take. In FIGS. 2 and 3, the lower mandible 13 of the jaw of the animal is shown having incisor teeth 14 at the forward end thereof and spaced well back of the incisor teeth are premolar teeth 15. In the region between the incisor and premolar teeth there is a space which is used to position a sensor in accordance with the invention. Referring particularly to FIG. 3, it will be seen that each telltale, 30 or 40, in accordance with the invention includes a tubular portion 16 which is provided at the outer end thereof with a hypodermic shaped beveled tip 17 to make for easy penetration of the lip 18 of the animal. Tube 16 can be conveniently formed from a piece of tubing corresponding in dimensions to that of a No. 16 or No. 18 hypodermic needle.

At the opposite end of needle 16 from pointed end 17 there is a reservoir 19 which is shown as being of cylindrical form. Reservoir 19 is conveniently formed from a cup-shaped member with a flange 20 around the upper edge thereof. Joined to flange 20 is a lid member 21 which has been in turn joined to the lower flanged region 22 of needle 16. The joining of cover member 21 to needle 16 and to cylinder 19 can be conveniently accomplished by either hot or cold welding. Other joining techniques using various bonding agents may also be used.

The outer portion of the tube 16 is provided with ferrule portions 23 adjacent tip 17 for holding the indicator portion 24 thereto.

The indicator portion 24 is conveniently formed by heat sealing two flat sections of transparent plastic material such as an acrylic plastic-like methyl methacrylate along the peripheral edges thereof and in such a manner as to form an internal cavity 33 between the walls thereof. At the upper end of member 24 there is provided a tube-like section 26 in communication with chamber 33 of a size to slip over the end of tube 16 and be fixedly held thereto by means such as ferrules 23. In the internal cavity 33 there is provided a suitable reagent material which may either be colorless or have a first distinctive color in the unreacted condition. Chamber 33 may be provided with a wick 25 to aid in mixing of reactants once the predetermined temperature has been exceeded.

Various reactions may be used for the indicating portion. One which is convenient and inexpensive is the use of a pH-sensitive material such as methyl red dissolved in an appropriate quantity of water containing substance and having a pH such that the indicator is in the neutral or basic condition and yellow in color. Desirably the water containing substance will be a mixture of water and an anti-freeze type material such as ethylene glycol or an alcohol. Upon the animal having attained or exceeded the predetermined temperature, which is a possible indication that the animal has become diseased, a reactant substance contained within the reservoir portion 19 and/or tube 16 is allowed to intermix with the solution contained within indicating portion 24 to bring about a color change. For example, with methyl red one may use an acidic material as the substance contained within reservoir 19. Upon the acid solution contacting the pH-sensitive solution in reservoir 24, a color change from yellow to red will occur thereby giving a readily observable visual change that the animal has had a fever.

Various mechanisms have been found suitable for activation of the general device of the invention. Referring to FIG. 3, there is shown in the righthand portion thereof a device generally designated 30 which operates upon the principle of a thermal expansion due to temperature. In the device 30 a quantity of thermally expandible substance 31 is included within reservoir chamber 19. Material 31 is desirably a material which is solid at normal temperature for the animal and undergoes a change in state at a predetermined temperature of a fevered animal. Methyl stearate is one such material. Forward of substance 31 is the reactant substance 27 which fills the balance of chamber 19 as well as the bore of tube 16. Plug 32 under normal temperatures prevents substance 27 from leaving the tube 16. As the predetermined temperature is reached, substance 31 has expanded as has 27 to fill the chamber and tube. With increase in temperature the continued expansion forces plug 32 from tube 16 permitting mixing of fluid 27 and fluid in chamber 33 to produce a color change. The expulsion of fluid 27 and plug 32 is aided by the volume change of material 31 as it undergoes a change in state from solid to liquid.

In the preceding description, reference has been made to a barrier or plug as a separation means for the reactant material in the reservoir from the indicator tag cavity that is external to the body. While such a barrier is necessary to prevent unwanted mixing of the reactant and indicator materials, it should be understood that the barrier can be merely an air bubble when tube 16 is of relatively small diameter. As the only function is separation, an air bubble will function as a barrier provided the volatility of the separated materials is low enough not to transfer excessive quantities of the reactants. An immiscible liquid can also be used as the barrier material. For example, if the sensor liquid and the indicator liquids are both water, then a water insoluble liquid can be used as the barrier material.

As is well known, only a very small quantity of an acid or base need be added to a solution to bring about a wide shift in the pH thereof. Therefore, even a partial drop of liquid will suffice to change the pH and thus the color of the indicator contained within unit 24. As an aid to bringing about a positive mixing of the solution from the reservoir with the solution contained within the indicator portion 24, one may provide a wick material such as thread element 25. As an instantaneous reaction is not essential to the operation of the invention, the fact that an instant response may not take place is not of great significance. If the indication takes place over several minutes or even longer, it still provides the cattle raiser with relatively prompt notification of the fact that the animal has experienced an unusual rise in temperature. The change in color, of course, remains even after the animal's temperature has returned to normal.

In the manufacture of a device in accordance with unit 30, a convenient form of manufacture is to include the solid 31 within the cylindrical member 19 prior to the overall assembly. A predetermined amount of solid melting at or close to the predetermined temperature can be metered into member 19 so as to essentially completely fill this cavity. Lid member 21 may be then joined to the member 19 around flange 20. Then, by use of a constant temperature environment one can heat and expand solid 31 so as to attain the expansion it would have at just below its melting point and the predetermined temperature. For example, if one wishes to know whether a cow has exceeded 105°F and solid 31 melted at this point, one would use as the temperature of the constant temperature environment approximately 104°F during manufacture. Once solid 31 has reached 104°F, the balance of the can and tube 16 would be filled with liquid 27. One way in which this can be done is to inject by means of a fine hypodermic needle a solution to fill the balance of cavity 19 and tube 16 with the reactant 27 for bringing about the color change indicator 24. When the tube 16 is substantially filled and void free, a plug material 32 such as a wax or soft plastic may be used to seal the end 17 of the tube 16.

Installation of the device within the animal is conveniently accomplished during the time the animal is undergoing routine inspection in a treatment or chute. The operator grasps the animal's lower cheek, places the assembly 19 and 16 internal to the animal's mouth, punctures the lip portion 18 so as to bring tip 17 to the outward side of cheek 18. At this point the tube 26 of assembly 24 is slipped over the end of the tube 16 and becomes locked on by ferrules 23. The installation is thus complete. Until the animal reaches a temperature in excess of a predetermined limit (for example, 105°F), the color of the indicator portion will be that of a neutral or basic solution. After the animal has exceeded 105°F in temperature for a period of time sufficient to allow solid material 31 to reach thermal equilibrium plug 32 will be forced out of the end of tube 16 permitting intermixing of the reactant substance 27 within tube 16 with the indicator material within tube 24 to bring about the color change indicative of fever.

A somewhat different mechanism is involved with the unit on the left side of FIG. 3 which unit is generally designated 40. Unit 40 may be manufactured in somewhat analogous manner to that of unit 30. However, in this instance the portion of tube 16 adjacent lid 21 is blocked by means of a material which is insoluble in the reagent 27 materials and which melts at a predetermined temperature. As shown, chamber 19 is entirely filled with fluid 27. Expansion of the fluid 27 will give a relatively small volume change per degree centigrade. Reservoir 19 may be filled in a similar manner to the description given with respect to unit 30. Plug material 41 in this instance would be injected via the open end of tube 16 after the other materials were placed in 19. The reservoir portion of unit 40 may be filled as was unit 30. The reservoir may contain a relatively large mass of a non-reactant material 31 such as described above for device 30 and also contain a small quantity of active reagent substance analogous to 27. The change in state from solid to liquid provides a significantly larger volume change over a given temperature shift than a mere thermal expansion. Operation of the device 40 combines the expansion aspects of device 30 along with the fusable plug 41. That is, as the temperature of the animal reaches a predetermined fever temperature, fusable plug 41 will melt and permit the expanded liquid reagent 27 within chamber 19 to flow out through tube 16 into indicator 24. When solid 31 is in chamber 19, the expansion resulting from a solid to liquid transition aids in expelling the fluid reactant from chamber 19 into chamber 24 to mix with the reagent contained therein to bring about the color change indicative of the fact that the animal has been experiencing a temperature at or in excess of the predetermined one.

Figures 4, 4A, 6:
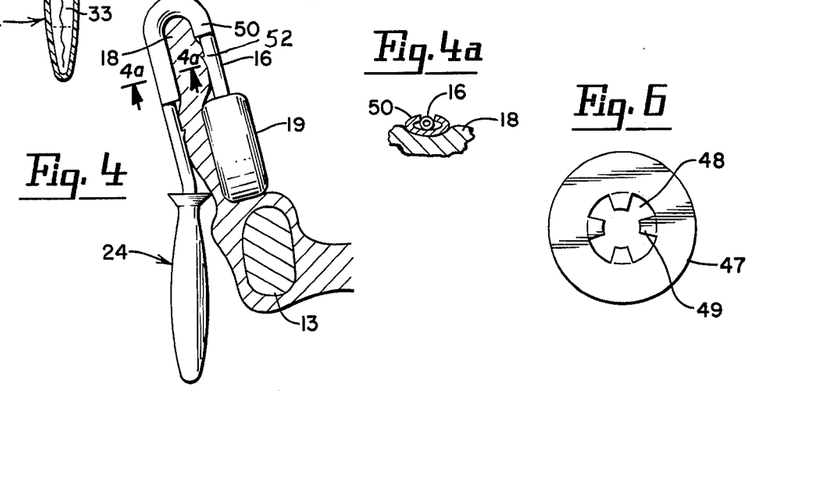
FIG. 4 is a cross-sectional view of a portion of the jaw of a cow showing another manner of implanting a device in accordance with the invention.
FIG. 4a is a cross-sectional view along lines 4a—4a of FIG. 4.
FIG. 6 is a front elevational view of the latching member of FIG. 5 for holding the tube and indicator portion together.
Figures 5, 7, 8, 8A:
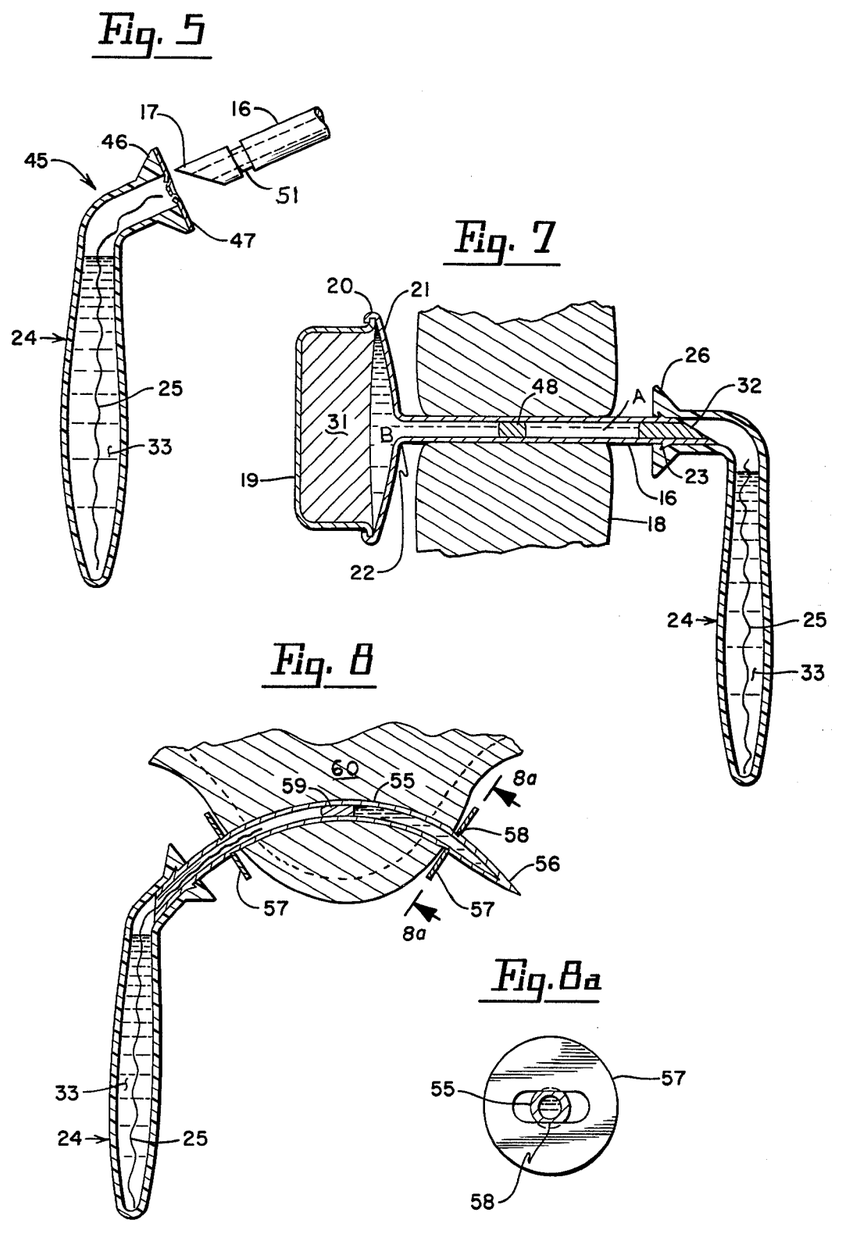
FIG. 5 is a cross-sectional view of the detail of the indicator portion and method of joining same to the reservoir tube.
FIG. 7 is a cross-sectional view of an indicator in accordance with the invention showing a two-stage temperature telltale indicator.
FIG. 8 is another form of telltale for use in accordance with the invention.
FIG. 8a is a front elevational view of a stop member of FIG. 8.

Referring now to FIGS. 5 and 6, there is shown a detailed cross-sectional and front elevational view respectively of the elements comprising the indicator portion and one method of joinder thereof with the needle 16. A tubular portion is provided on plastic element 24 and is generally designated 45. A thickened outer extremity 46 has had joined thereto by suitable bonding means a metal disc 47 having an opening 48 centrally located therein. Disc 47 (as best seen in FIG. 6) has been provided with a plurality of finger elements 49 which extend toward the center of the opening 48. Figure members 49 yieldably move when needle 16 is pressed into the opening in tubular member 45. Tube 16 is provided with a groove 51 around the periphery thereof into which finger members 49 lock as tube 16 is inserted into tube 45. This positive latching action will tend to prevent disengagement of the tubes from one another. Other manners of joining have already been described with regard to FIG. 3 wherein locking is provided by means of a ferrule.

In FIG. 7, there is illustrated a double-action temperature indicator device which is in most respects the same as that described with respect to FIG. 3. That is, it includes a reservoir 19 and a tube member 16 joined thereto. As in the case with the device 30 of FIG. 3, an expandable material such as solid 31 occupies the great majority of the reservoir 19 with a small portion of the reservoir and tube member 16 being occupied by reactant fluids. In the instance of the device of FIG. 7, two separate fluid compartments are provided and are identified A and B respectively. The fluids A and B are separated by plug member 44 while fluid A is prevented from leaving tube 16 by plug 32. The indicator portion 24 of the device is of the same construction as that previously described with the exception that the indicator substance contained therein is capable of reacting to produce different colors with A and B.

The operation of the device of FIG. 7 should now be apparent. As the temperature of the animal attains a first predetermined point, for example 105°F, the expansion of material 31 and the reactant materials A and B brings about an ejection of plug 32 with the subsequent passage of fluid A into chamber 24 to mix with fluid 33. The selection of the reagents is such that the fluid A reacts with the reactant in chamber 24 to produce a first color. Should the animal's temperature exceed 105°F to some second predetermined point such as 107°F, the continued expansion of material 31 and fluid B will result in movement of plug 48 out beyond the end of tube 16 so that reagent B can now pass into the indicator chamber 24. Reagent B is selected so as to bring about a second quite different color from that produced by the reaction of reagent A. As an example of the double reaction, chamber 33 could contain a colorless slightly acidic solution. Solution A could include a quantity of a neutral solution of bromcresol green. Solution B could be a basic solution of methyl red. At normal animal temperature, the indicator tag 24 would be colorless. As the first predetermined temperature is exceeded, the solution A would pass into chamber 24 and produce a yellow color. If and when the temperature exceeded the second predetermined point, solution B would enter and produce a green color.

The operator thus can have a plurality of indications from examining the external indicator portion 24. If the color is the same as that originally contained therein, then the animal has not experienced any temperature in excess of 105°F. If the color is changed to that produced by the reaction of reagent A with the material contained within chamber 24 to produce its characteristic color, he is aware that the animal has experienced a temperature of at least 105°F but less than 107°F. If the color in chamber 24 is that produced by the reaction of material B, the operator will then know that the animal has experienced the much high temperature of 107°F or above. He can thus take appropriate steps to both isolate and look for symptoms characteristic of the highly elevated temperature.

In FIG. 4, there is illustrated another form of the invention wherein the reservoir portion 19 is joined to indicator portion 24 by a tube member 16 which in this instance does not penetrate through the hide of the animal but rather passes in a loop form over and around the lip of the animal. A metal sheath member 50 having appropriate spring characteristics encircles tube 16 so as to both protect it from being crimped and to provide a clamping action on lip 18. Barb members 52 lock the tube into the flesh of the inner cheek so that it does not readily become dislodged from engagement with the lip 18 of the animal.

The operation of the device of FIG. 4 can take the form of a purely thermal expansion with forcing out of a plug as described for device 30 or it can take the form of a melting or fusion of a barrier plug as in the case of device 40.

Operation of a telltale in accordance with that shown in FIG. 4 has advantages over that of those devices previously described. While the mechanisms which are usable are substantially the same, the advantages from use of this form of my invention lie primarily in the fact that the user of the devices has a totally factory manufactured unit without any necessity for his coupling the reservoir and indicator sections as has been described with regard to the devices of FIGS. 3 and 7. As can be readily understood, there is insertion problems in devices as shown in FIGS. 3 and 7 in that a portion of the device must be actually placed through the cheek of the animal and then joined to the indicator portion of the device.

Figures 9, 10:
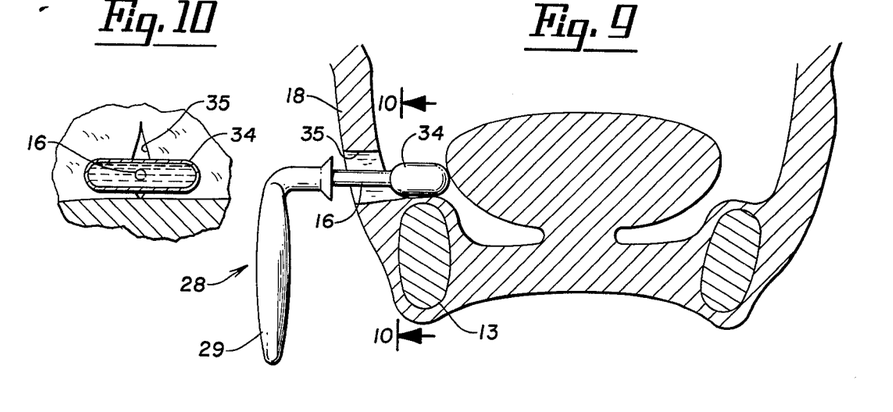
FIG. 9 is a cross-sectional view of a cow's jaw as in FIG. 3 showing a form of the invention.
FIG. 10 is a view along line 10—10 of FIG. 9 showing the device of FIG. 9 and the technique for implanting same within the animal's mouth.

Turning now to FIG. 9, there is illustrated a crosssectional view of the jaw portion of an animal as has been illustrated with regard to FIG. 3. The telltale unit of FIG. 9 is generally designated 28. This unit is similar in most respects to the units which have already been described and may utilize any one of the several techniques of filling and activation. That is, it may utilize a fusable plug as did the device of telltale 40 or it may utilize a barrier material which is expelled from the tube as was described with regard to telltale 30. Unit 28 in common with the unit of FIG. 4 is a factory assembled unit. It has been fabricated so that the ultimate user does not join the indicator section 29 to the tube 16 and reservoir 34. These units are already joined to one another and merely await placement by the user of the device.

Referring to FIG. 10, there is shown a cross-sectional view along lines 10—10 of FIG. 9 showing the reservoir portion 14 in place within the lower jaw region of the animal. As can be seen, reservoir 34 has a flat oval cross-sectional configuration and is of longer length than width with the innermost end thereof tapering to a near point. In inserting the device into the mouth of the animal for use as a telltale, the operator first provides a vertically oriented elongated slit 35 in and through the animal's cheek of a total length just sufficient to permit reservoir 34 to be forcedly inserted therethrough. Of course, when inserting the unit through slit 35, the reservoir portion 34 will be oriented along the same axis as the length of slit 35. Once the unit has passed through the slit 35 into the inner region of cheek 18, the unit is rotated so as to be locked against motion outwardly back through slit 35. Tubing 16 being of a stainless steel composition, or other material which is compatible with the living flesh of the animal, permits a rapid healing of the surgically incised slit 35 so as to lock the unit into position.

Other techniques may be utilized to hold a telltale in accordance with any of the several forms of the invention in place within the mouth of the animal. Where greatest sensitivity of sensing is desired, it has been found advantageous to position the reservoir portion of the unit beneath the tongue of the animal rather than merely within the mouth cavity.

For certain users of the telltale of the invention, it is also expected that there will be some reluctance to actually penetrate the hide portion of the animal so as to permanently or at least semi-permanently position a telltale in accordance with the invention within the mouth of the animal. For such users, the arrangements of FIGS. 11 through 14 will prove advantageous.

Figure 11:
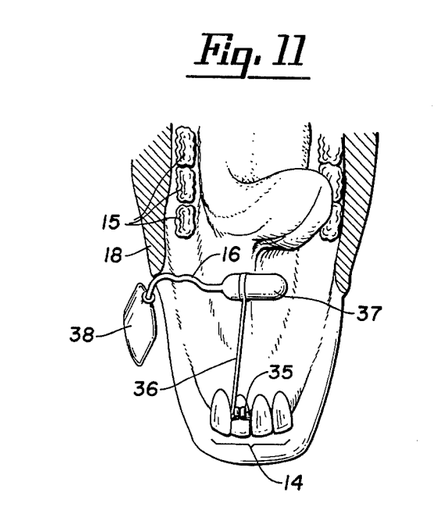
FIG. 11 is a top view of the inside lower jaw of an animal with a sensor and indicator device in accordance with the invention anchored in place by means of an attachment to an incisor tooth.
Figure 13:
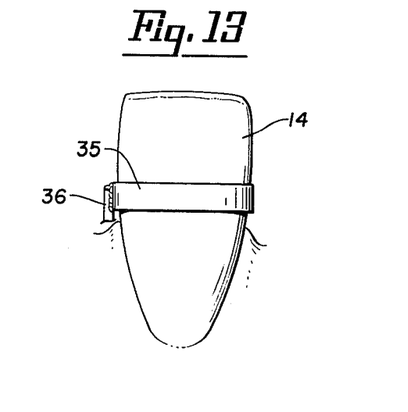
FIG. 13 is an elevational view of a tooth and the anchoring clip.
Figure 14:
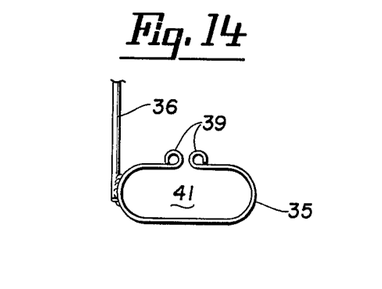
FIG. 14 is a top view of the clip of FIG. 13.

Referring now to FIGS. 11-14, there is illustrated in FIG. 11 a top view of the lower jaw of an animal showing only the forward portion thereof. The section where the tongue joins the flesh in the central lower portion of the jaw is illustrated, but the tongue itself is now shown for clarity of showing the other features involving the invention. The incisor teeth 14 as illustrated in FIG. 11 form one manner of anchoring a nonpenetrating telltale in accordance with the invention into a central position within the jaw. A suitable clamp means 35 is attached to an incisor tooth as shown in FIG. 11. Various types of clamping arrangements for teeth can be utilized and the specific form illustrated in FIGS. 13 and 14 are merely illustrative of one type. Attached to clamp 35 by means such as welding is an extending spring steel wire arm member 36 with the remote end thereof joined to the reservoir portion 37 of a telltale. Desirably, wire 36 will be of a stainless steel spring type and will conform generally to the shape of the lower portion of the inner edge of the jaw. The tube 16 which joins reservoir 37 to the indication portion 38 of a telltale in accordance with the invention is likewise desirably shaped to conform at least in a general way to the bottom of the mouth and the region extending over the mandible and over the lip of the animal in a manner somewhat similar to that shown in FIG. 4. This type of arrangement permits insertion of the device in a positive locking action within the mouth of the animal and allows reservoir 37 to be positioned wherever desired within the mouth in a reasonably fixed manner. Tube 16 is of sufficient stiffness to generally maintain its relationship to the device as inserted and keep the indicator portion 38 exterior to the animal's mouth. Such a device can be readily fabricated at the factory so that there is no joining of parts at the time the unit is inserted in the animal's mouth.

Referring now to FIGS. 13 and 14, a simple tooth clamping arrangement is illustrated which comprises a band 35 which is of a shape to generally conform to the shape of a tooth. At the ends of the band the metal has been turned back on itself so as to form a pair of loop members 39. Band 35 should be of a high spring steel arrangement. The opening defined by member 35 will be slightly smaller than that of the tooth of the animal. By use of a suitable spreading tool having pins conforming to the openings in loops 39, the entire assembly including the telltale is inserted into the animal's mouth and the tooth is slipped into the opening 41 whereupon the spreading action of the tool is released and the member 35 clamps itself onto the tooth. As the tooth is somewhat larger at its upper extremity, the clamping arrangement is not free to slip off of the tooth. Should it be desired to remove the device at a later time, one can readily reinsert the prongs of a spreading tool and release the clamp on the tooth.

Figure 12:
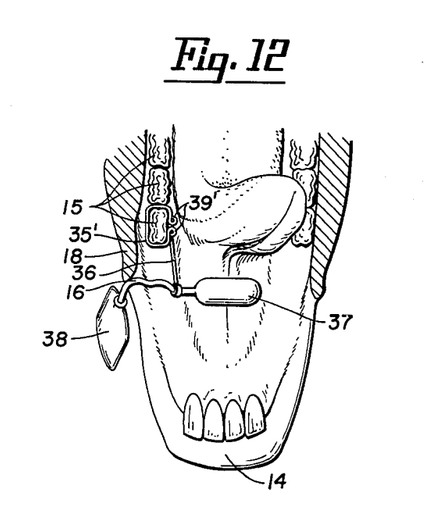
FIG. 12 is a top view of the inside lower jaw of an animal with a sensor and indicator device in accordance with the invention anchored in place by means of an attachment to a molar tooth.

In FIG. 12, there is a substantially similar device as that described with regard to FIG. 11 except in this instance a clamp 35' has been shaped to generally conform to a premolar tooth of the animal and the device is anchored from this position rather than from one of the incisor teeth.

It should also be appreciated that it is not necessary when using the tooth clamping arrangement of FIGS. 11 and 12 to position the reservoir 37 in the central portion of the mouth. The reservoir can be positioned in other locations within the mouth such as shown in FIGS. 3 and 7.

In FIG. 8 there is illustrated yet another form of the invention. In this instance an arcuate tube member 55 comprises the reservoir and the hypodermic puncturing means. A sharpened tip 56 is utilized to pass tube 55 through a flap of hide and flesh 60 which is held outwardly by the operator during the insertion of the tube 55 therethrough. After passage through the hide of the animal in the manner illustrated in FIG. 8 a lock collar member 57, which may also be of the same type of construction as that shown in FIG. 6, is passed over the tip 56 of needle 55 and locked into a groove 58 provided around the periphery of the needle thus locking it against being pulled backwardly through the hide. At the opposite end from the sharpened tip 56 there is provided an indicator portion 24 which may be of the identical construction to that described in the previous figures. A quantity of a fusable substance 59 is introduced into the needle and separates the reactant material in the sharpened end of the needle from mixing with the reactant material in chamber 24. Should the animal experience a temperature such that plug 59 is fused then the reactant material in the tube can bleed downwardly into chamber 24 to bring about reactions as previously indicated.

The invention has been described in generalized terms and it will be readily apparent to the reader that a wide variety of reactants and types of reactions can be utilized to bring about the desired color changes. As examples of such color changes, the following is intended to be only indicating the wide range available rather than being a restrictive listing.

The use of pH indicators has already been noted. The indicator chemical may be either in the solution in tag 24 or it may be dissolved in the solution 27. Solution 33 and solution 27 may alternately be acid or basic relative to one another for bringing about the pH change that is the indication of a fevered animal. As is well known only very small quantities of an acid or base are required to bring about a pH change of a magnitude such as is needed to bring about a color change of an indicator. Even a fraction of a drop of moderately concentrated acid or base is sufficient to change the pH of hundreds of milliliters of solution.

One may in an analogous way use oxidation-reduction reactions and indicators rather than pH. In this instance, an oxidizer solution would be in one portion while the reducing would be separated by a barrier until the predetermined temperature has been exceeded.

Complexing reaction such as nickel-dimethyl glyoxime may also be used. The reactants would be on opposite sides of the barrier until the predetermined temperature has been exceeded. Various thermally melting barrier materials and materials corresponding to solid 31 may be used. Chemical handbooks will reveal many materials suitable for the purpose. Of course, the user must insure that the barrier and/or expandable solid 31 are compatible with the fluids 27 and 33. That is, solubility, reactability, etc., must be considered when selection is made for each of the elements. Also, as set forth previously, in some instances the barrier can simply be an air bubble.

As an aid to the reader reference is made to the following U.S. Pat. Nos. which disclose lists of materials which can be used for the thermally melting barrier and the solid 31: 3,430,491; 3,465,590; 3,521,489; and 3,597,976.

What is claimed is:

1. The method of continuously monitoring an animal to determine whether the animal has experienced a body temperature in excess of a predetermined level comprising:
   a. providing a reservoir and tube assembly, containing therein a first reactant and a barrier to movement of said first reactant through said tube and outwardly therefrom, said barrier being displaced upon said assembly reaching said predetermined temperature to permit said first reactant to pass outwardly therefrom;
   b. inserting the tube portion of said assembly through the cheek of said animal from the inside so as to leave at least the reservoir portion of the assembly in the animal's mouth; and
   c. joining an indicator tag portion including a cavity containing a second reactant so as to be in fluid communication with the end of said tube projecting outwardly from said animal so that upon said animal attaining a temperature in excess of said predetermined mimimum the barrier means is displaced and said first reactant will enter said cavity portion of said tag and react with second reactant to produce a color change.

2. The method of continuously monitoring an animal to determine whether the animal has experienced a body temperature in excess of a predetermined level comprising:
   a. providing a tube and reservoir assembly including at the closed end thereof a first reactant material and in the tube portion thereof a barrier material, said barrier material melting at said predetermined temperature, the open end of said tube being joined to and in fluid communication with the interior cavity of an indicator tag, said interior cavity containing a second reactant material; and,
   b. inserting the tube portion of said assembly through a hide and flesh portion of the animal to position the portion of said tube containing said barrier material within the animal leaving the indicator tag external to said animal.

3. The method in accordance with claim 2 wherein the tag portion and at least a portion of the reservoir are external to the animal.

4. The method in accordance with claim 1 wherein the animal is a grazing animal and the reservoir is positioned in the region of the animal's mouth intermediate the incisor and premolar teeth.

5. An implantable telltale for indicating whether an animal has experienced an internal temperature above a predetermined level comprising:
   a. a temperature sensor portion including a reservoir and tube assembly defining a chamber, the free end of said tube being of a size and shape to constitute a means for insertion of at least a portion of said tube through the hide portion of an animal to define a means for fluid communication between the inside and outside of the said animal;
   b. a first reactant material within said chamber;
   c. an external indicator or tag defining a cavity, said tag constructed and arranged to be joined to the free end of said tube so that the cavity is in fluid communication with said tube at said free end, said cavity containing a second reactant material; and
   d. a fluid first flow barrier means within said tube for separating said first reactant from said indicator tag cavity, said barrier means defining a temperature controlled removable means in said tube that is displaced when said sensor portion that is internal to said animal has exceeded said predetermined limit thereby mixing said first and second reactants to produce a visual change in said indicator tag that the animal's body temperature has exceeded said predetermined level.

6. A telltale in accordance with claim 5 wherein said barrier means is located within said tube in the region internal to the hide of the animal and is a mass of material which melts at said predetermined temperature thereby allowing intermixing of said first and second reactants when said predetermined temperature is attained.

7. A telltale in accordance with claim 5 wherein said barrier is adjacent the free end of said tube and said reservoir and tube contain thermally expandable material in a quantity to fill said chamber and dislodge said barrier from said tube at said predetermined temperature to cause intermixing of said first and second reactants.

8. A telltale in accordance with claim 7 wherein the major portion of said reservoir is filled with a solid material that undergoes a transition from the solid to the liquid state at about said predetermined temperature and said first reactant is positioned intermediate said solid and said free end of said tube.

9. A telltale in accordance with claim 6 wherein said reservoir is filled with solid material that undergoes a transition from the solid to the liquid state at about said predetermined temperature and said first reactant is intermediate said solid and said barrier.

10. A telltale in accordance with claim 7 wherein said tube includes first and second spaced barrier materials therein, the region intermediate said first and second barrier being filled with said first reactant and wherein said reservoir and said tube on the opposite side of said second barrier from said first reactant includes a third reactant, said first and second reactants when mixed producing a first color change in said indicator tag and said first, and second and third reactants when mixed providing a second color change in said indicator tag.

11. The method of continuously monitoring an animal to determine whether the animal has experienced a body temperature in excess of a predetermined level comprising:
 a. providing a reservoir and tube assembly containing therein a first reactant and a barrier to movement of said reactant through said tube outwardly therefrom, said barrier being displaced upon said assembly reaching said predetermined temperature to permit the reactant to pass outwardly therefrom;
 b. joining an indicator tag including a cavity containing a second reactant so as to be in fluid communication with the free end of said tube;
 c. positioning said reservoir within the mouth of said animal adjacent a lip portion and intermediate the incisor and premolar teeth and looping said tube over the lip of said animal so that said tag is on the outer side of said lip opposite said reservoir; and
 d. providing means for holding said reservoir, tube and tag in fixed relationship to said lip.

12. An implantable telltale for indicating whether an animal has experienced an internal temperature above a predetermined level comprising:
 a. a temperature sensor portion including a reservoir and tube assembly defining a first chamber with one end of said tube joined to and in fluid communication with said reservoir and extending outwardly therefrom, the reservoir portion of said assembly being of a configuration and size to be at least semi-permanently lodged within said animal's mouth;
 b. said chamber being substantially filled with a thermally expanding material including a first reactant material positioned in conjunction with the second end of the tube portion thereof;
 c. an indicator tag defining a cavity, said indicator tag being joined to the opposite end of said tube from said reservoir to be in fluid communication therewith, said cavity containing a second reactant material;
 d. means for at least semi-permanently mounting said reservoir portion within the mouth of an animal with the tag portion of said telltale exterior to said animal; and
 e. a movable flow barrier means within said tube for selectively separating said first reactant material from said indicator tag cavity, said movable means defining a temperature responsive flow control means for the intermixing of said first and second reactants in said tag when the internal temperature in said animal has exceeded a predetermined level to thereby produce intermixing of said first and second reactants within said indicator tag to provide a visual change in said indicator tag signalling that the animal's body temperature has exceeded said predetermined level.

13. An implantable telltale in accordance with claim 12 wherein the means for mounting said reservoir within the animal's mouth is a clamp so shaped and configured as to be attached to a tooth of the animal and means joining said clamp to said reservoir and tube assembly.

14. A telltale in accordance with claim 13 wherein said clamp is shaped to be joined to an incisor tooth and the means joining said clamp to said reservoir and tube assembly is a wire of a length to position said reservoir beneath the animal's tongue.

15. A telltale in accordance with claim 12 wherein said clamp is shaped to be joined to a premolar tooth.

16. A telltale in accordance with claim 12 wherein the reservoir is of an elongated and oval cross-sectional shape so that upon insertion through a slit in the cheek of the animal and rotation of the reservoir the reservoir is held in the animal's mouth by a keying action.

17. A telltale in accordance with claim 13 wherein the means for joining said clamp to the reservoir and tube assembly is a spring steel wire so shaped that it presses the reservoir portion against the lower surface of the inner part of the animal's jaw.

18. A method of continuously monitoring an animal to determine whether the animal has experienced a body temperature in excess of a predetermined level comprising:
 a. providing a reservoir, tube and indicator assembly, said reservoir being substantially filled with a thermally expandable material and including a first reactant material in fluid communication with said tube, said indicator tag defining a cavity containing a second reactant substance and said tube having a barrier means therewithin for normally preventing said first and second reactants from mixing, until the temperature of said reservoir has reached a first predetermined level to expell said first reactant into said tag cavity;
 b. inserting said reservoir into the mouth portion of the animal; and
 c. anchoring said reservoir in at least semi-permanent position within said animal's mouth.

19. The method in accordance with claim 18 wherein said reservoir has an oval cross-section and said animal's cheek is provided with a slit therethrough through which said reservoir is inserted while in axial alignment and then rotated to lock in place by keying action.

20. The method with claim 18 wherein said anchoring is by attaching the assembly to a tooth of the animal.

* * * * *